United States Patent
Cao (10) Patent No.: US 10,970,464 B2
(45) Date of Patent: Apr. 6, 2021

(54) METHOD, DEVICE FOR PROCESSING WEBPAGE CONTENT AND STORAGE MEDIUM

(71) Applicant: ZTE Corporation, Shenzhen (CN)

(72) Inventor: Gang Cao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/686,019

(22) Filed: Nov. 15, 2019

(65) Prior Publication Data

US 2020/0081957 A1 Mar. 12, 2020

Related U.S. Application Data

(63) Continuation of application No. PCT/CN2018/086064, filed on May 8, 2018.

(30) Foreign Application Priority Data

May 17, 2017 (CN) .......................... 201710351041.9

(51) Int. Cl.
*G06F 16/958* (2019.01)
*G06F 40/14* (2020.01)
(Continued)

(52) U.S. Cl.
CPC .......... *G06F 40/106* (2020.01); *G06F 16/951* (2019.01); *G06F 16/958* (2019.01);
(Continued)

(58) Field of Classification Search
CPC .... G06F 40/106; G06F 16/951; G06F 16/958; G06F 40/14; G06F 16/986; G06T 7/70; G06T 2207/30176
See application file for complete search history.

(56) References Cited

U.S. PATENT DOCUMENTS 8,989,485 B2 3/2015 Chulinin et al.
2011/0238741 A1* 9/2011 Ishikawa ............... G06F 16/958
709/203

(Continued)

FOREIGN PATENT DOCUMENTS

CN 1685358 10/2005
CN 1786947 A 6/2006
CN 103309961 A 9/2013

OTHER PUBLICATIONS

"Extracting *relevant* image from a web-page", Jun. 28, 2010, 3 pages (Year: 2010).*

(Continued)

*Primary Examiner* — Yongjia Pan
(74) *Attorney, Agent, or Firm* — Bond Schoeneck & King, PLLC; George McGuire (57) ABSTRACT

A method, device for processing web content and a storage medium, the method comprising: determining, in a histogram statistical array of a webpage snapshot, a starting position and an ending position of a longest continuous image along a longitudinal axis direction; determining, based on a resolution of the webpage snapshot, a first starting position and a first ending position of a body in the webpage snapshot along the longitudinal axis direction in a range from the starting position to the ending position in the longitudinal axis direction; determining, based a rendering tree of the webpage snapshot, a second starting position and a second ending position of the body in the webpage snapshot in the longitudinal axis direction in a range from the first starting position to the first ending position.

15 Claims, 4 Drawing Sheets

(51) Int. Cl.
*G06F 16/951* (2019.01)
*G06F 40/106* (2020.01)
*G06T 7/70* (2017.01)

(52) U.S. Cl.
CPC ............... *G06F 40/14* (2020.01); *G06T 7/70* (2017.01); *G06T 2207/30176* (2013.01)

(56) References Cited

U.S. PATENT DOCUMENTS

| | | | | |
|---|---|---|---|---|
| 2012/0054597 | A1* | 3/2012 | Yamada | G06T 11/60 715/234 |
| 2012/0204101 | A1* | 8/2012 | Yoshida | G06F 3/04842 715/246 |
| 2015/0121196 | A1* | 4/2015 | Ye | G06F 40/166 715/234 |
| 2015/0212988 | A1* | 7/2015 | Ogawa | G06F 16/9577 715/234 |

OTHER PUBLICATIONS

"How to find and extract "main" image in website", Aug. 16, 2013, 3 pages (Year: 2013).*
"How to scrape only the largest images from the DOM?", May 28, 2012, 3 pages (Year: 2012).*
"Html DOM only scrape largest image", Jan. 23, 2012, 3 pages (Year: 2012).*
"How do you find the "main" picture of a website, given the URL?", Oct. 30, 2010, 3 pages (Year: 2010).*
Ghostdriver's ElementQueryingTest.java, May 7, 2014, 4 pages (Year: 2014).*
ImageResolver's ImageResolver.0.5.2.js, May 26, 2014, 253 pages (Year: 2014).*
Goose's ContentExtractor.scala, Jun. 12, 2012, 14 pages (Year: 2012).*
Goose's wiki, Oct. 29, 2014, 5 pages (Year: 2014).*

* cited by examiner

METHOD, DEVICE FOR PROCESSING WEBPAGE CONTENT AND STORAGE MEDIUM

CROSS-REFERENCE TO RELATED APPLICATION

This application is a continuation of International Application No. PCT/CN2018/086064, filed on May 8, 2018, which is based upon and claims priority to Chinese Patent Application No. 201710351041.9, filed on May 17, 2017, the entire contents of which are incorporated herein by reference.

TECHNICAL FIELD

The disclosure relates to but not limited to, an internet browser webpage content extraction technology, in particular to a method, a device for processing webpage content and a storage medium.

BACKGROUND

In order to avoid frequent page turning operations, content in the webpage may be extracted and spliced into one webpage based on an user's request when there are multiple pages of news-type or novel-type body content on the website. In order to extract the body content required from the webpage, a location of the body can be found according to a position of a button label of a next page in the webpage, or a label attribute corresponding to the body may be recorded through manually traversing webpages of various websites, and then a label element of the body can be found based on the attribute. Although an extraction of the body content required in the webpage can be achieved by means of this method, an inaccurate extraction of the body is achieved due to frequent changes of the webpage layout or the label attribute, thereby affecting the user's reading experience.

SUMMARY

The following are outlines of the subject detailed herein. The outlines are not intended to limit the scope of the claims.

The embodiments of the present disclosure are directed to provide a method, a device, for processing webpage content and a storage medium, which can accurately extract webpage content required in a browser, and improve accuracy of webpage content extraction.

A method for processing web contents provided in an embodiment of the present disclosure, includes: determining, in a histogram statistical array of a webpage snapshot, a starting position and an ending position of a longest continuous image along a longitudinal axis direction; determining, based on a resolution of the webpage snapshot, a first starting position and a first ending position of a body in the webpage snapshot along the longitudinal axis direction in a range from the starting position to the ending position in the longitudinal axis direction; and determining, based a rendering tree of the webpage snapshot, a second starting position and a second ending position of the body in the webpage snapshot in the longitudinal axis direction in a range from the first starting position to the first ending position.

An embodiment of the disclosure also provides a device for processing webpage contents, including: a histogram locating module configured to determine, in a histogram statistical array of a webpage snapshot, a starting position and an ending position of a longest continuous image along a longitudinal axis direction; an initial locating module configured to determine, based on a resolution of the webpage snapshot, a first starting position and a first ending position of a body in the webpage snapshot along the longitudinal axis direction in a range from the starting position to the ending position in the longitudinal axis direction; and a precise locating module configured to determine, based a rendering tree of the webpage snapshot, a second starting position and a second ending position of the body in the webpage snapshot in the longitudinal axis direction in a range from the first starting position to the first ending position.

An embodiment of the disclosure also provides a storage medium having stored thereon computer programs, which, when executed by a processor, cause the processor to implement the above method for processing web contents.

In the embodiment of the disclosure, the initial starting position and the initial ending position of the body content in the webpage snapshot are first determined according to the webpage snapshot, and then the precise position of the body content of the webpage snapshot, i.e., the second starting position and the second ending position, is obtained according to the rendering tree of the webpage snapshot. The exact position of the content to be extracted in the body of the webpage can be automatically determined, so as to avoid the inaccurate extraction content caused by extracting the body content of the webpage merely according to the label attribute, and improve the user experience; a direct extraction of the webpage content without limiting service environment is achieved, thereby enabling a simple implementation and a wider application range.

DETAILED DESCRIPTION

In order to understand the features and technical contents of the embodiments of the present disclosure in more details, the implementation of the embodiments of the present disclosure will be described in details below with reference to the accompanying drawings. The accompanying drawings are for illustrative purposes only and are not intended to limit the disclosure.

In the records of the embodiments of the present disclosure, it should be noted that, unless otherwise stated and defined, the term "first/second" as used in the embodiments of the present disclosure is merely for distinguishing similar objects, and does not represent a specific sorting for specific objects. It should be understood that "first/second" may be interchanged in a particular sequence or order where permitted. It should be understood that objects distinguished by the term "first/second" may be interchanged as appropriate to enable the embodiments of the disclosure described herein to be carried out in a sequence other than those illustrated or described herein.

Before the present disclosure is further described in detail, the nouns and terms involved in the embodiments of the present disclosure are explained, and the nouns and terms involved in the embodiments of the present disclosure are applied to the following explanations.

Body content: in the present application, body content refers to content extracted from the webpage, and a user can determine which content in the webpage can be used as the body content according to his/her own requirement. For example, the user can determine that serialized novel content in a webpage is the body content of the webpage, and advertisement information in this webpage is non-body content.

Webpage snapshot: Webpage snapshot may refer to a rendered webpage snapshot extracted directly from a rendering module in a browser kernel. When there are multiple webpage snapshots with different resolutions, a webpage snapshot with the lowest resolution is selected.

It should be noted that since the extracted webpage content is mainly to be extracted a body part of the webpage, the body part and the non-body part mainly differ in positions in a longitudinal axis direction, so a positioning and an extraction for a horizontal axis direction are no longer considered.

Figure 1:
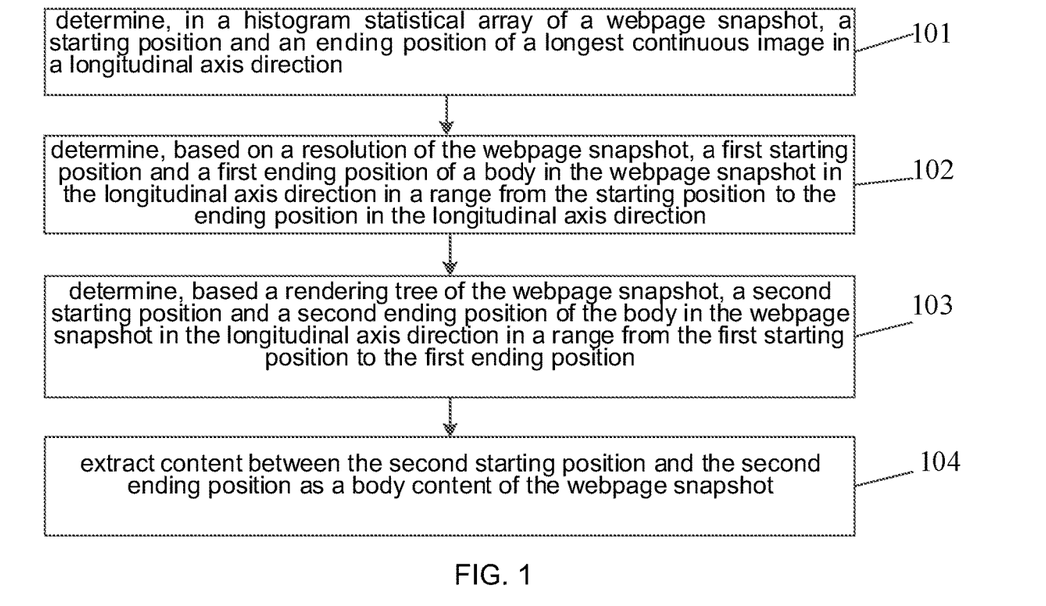
FIG. 1 is a schematic flowchart diagram of a method for processing webpage content according to an embodiment of the present disclosure.

FIG. 1 is a schematic flowchart diagram of a method for processing webpage contents according to an embodiment of the present disclosure. As shown in FIG. 1, a flow of a method for processing webpage contents according to an embodiment of the present disclosure includes the following steps.

In a step of 101: it is determined, in a histogram statistical array of a webpage snapshot, a starting position and an ending position of a longest continuous image in a longitudinal axis direction.

In a step of 102: it is determined, based on a resolution of the webpage snapshot, a first starting position and a first ending position of a body in the webpage snapshot in the longitudinal axis direction in a range from the starting position to the ending position in the longitudinal axis direction.

In a step of 103: it is determined, based on a rendering tree of the webpage snapshot, a second starting position and a second ending position of the body in the webpage snapshot in the longitudinal axis direction in a range from the first starting position to the first ending position.

In an embodiment of the present disclosure, the following step may also be performed.

In a step of 104: content between the second starting position and the second ending position is extracted as a body content of the webpage snapshot.

In actual usage, before determining, in the histogram statistical array of the webpage snapshot, the starting position and the ending position of the longest continuous image in the longitudinal axis direction, the method may further include filtering the webpage snapshot.

Herein, filtering the webpage snapshot includes switching a corresponding point of a link label of the webpage corresponding to the webpage snapshot from a displayed attribute mode to a hidden attribute mode.

Most of noise interference in the webpage snapshot can be filtered out by a filtering processing, and only the body part and sporadic noise are retained.

After filtering the webpage snapshot, the following operations may also be performed: binarizing the filtered webpage snapshot; expanding the binarized webpage snapshot; and performing histogram statistics of the expanded webpage snapshot in the longitudinal axis direction to obtain a histogram statistical array in the longitudinal axis direction.

Here, binarizing the filtered webpage snapshot includes, using mean binarization, histogram binarization, one-dimensional Means method. For example, the binarization processing can be performed using a histogram method, by first searching for a binarization threshold, and two highest peaks of an image grayscale histogram obtained by processing the webpage snapshot using the histogram method are first detected, and then the threshold is taken at the lowest point of the peak valleys between the two peaks. For example, if the grayscale of the image pixel is greater than or equal to the threshold, then it is set to 1, otherwise it is set to 0. In this way, the binarization processing of the webpage snapshot after the filtered processing is completed.

In addition, a reason for using the expanding processing lies in a space between body parts of the webpage snapshot, and the body parts of the webpage snapshot can be naturally connected together by the expanding processing, so as to facilitate the determination of the starting position and the ending position in the longitudinal axis direction. There are many methods for the expanding processing. Optionally, each pixel of the webpage snapshot after the binarization processing can be scanned by using a structural element, and an AND operation is performed between the structural element and the binary image covered by the structural element, and each pixel is processed to be continuous coding of 0 or 1, so as to eliminate the space between the bodies of the webpage; compressing a length of the body which needs to be connected, avoiding large solid blanks in the body link, and in the meantime improving the visual perception of the user; when using the structural elements, each pixel of the image may be scanned using a 3*3 structural element, the specific process including: an AND operation is performed between the structural element and the binarization image covered by the 3*3 structural element: if both are 0, the pixel of the webpage snapshot is 0, otherwise it is 1, and each pixel of the webpage snapshot is processed into a continuous encoding of 0 or 1.

The step of performing histogram statistics of the expanded webpage snapshot in the longitudinal axis direction to obtain the histogram statistical array in the longitudinal axis direction may include: performing statistics of projection with an element value of 1, of the expanded webpage snapshot in the longitudinal axis direction, and obtaining a histogram statistical array in the longitudinal axis direction according to a statistical result.

In practical applications, no matter which binarization processing method and expanding processing method is used, a histogram is formed. Due to no influence of the horizontal coordinates of the webpage snapshot on the body content which needs to be located, it only needs to locate the position of the body in the longitudinal axis direction, i.e. ordinate. It only needs to perform statistics on a projection with an element value of 1 in the longitudinal axis direction of the webpage snapshot. According to the histogram statistics, a statistical array $m[y]$ ($1=<y<=Y$) can be obtained, where Y is the maximum pixel height of the webpage snapshot, each value in the array represents the number of pixels with a pixel value of 1 in the direction of the image height y.

In an embodiment, the step 101 of determining the starting position and the ending position of the longest continuous image in the longitudinal axis direction may include following steps: setting a detection array, and a value range of elements in the detection array being the same as a value range of elements in the histogram statistical array; comparing a calculation of the histogram statistical array with a preset threshold; recording the calculation of the detection array as 1 if the calculation of the histogram statistical array is greater than the preset threshold; recording the calculation of the detection array as 0 if the calculation of the histogram statistical array is less than or equal to the preset threshold; and searching in the detection array for a maximum continuous step size with the calculation of 1.

Herein, a starting position of the maximum continuous step size is the starting position of the longest continuous image in a longitudinal axis direction. The ending position of the maximum continuous step size is the ending position of the longest continuous image in the longitudinal axis direction.

In an embodiment, the detection array $c[y]$ ($1 \leq y \leq Y$) may be initialized, where Y is the maximum pixel height of the webpage snapshot. Moreover, a threshold a may be set, where a is a value smaller than the width of the webpage snapshot, and a may be one-half of the width of the webpage snapshot. It is judged whether $m[y]$ is greater than a. If $m[y]$ is greater than a, then $c[y]=1$ is recorded. Herein, $c[y]=1$ indicates that the number of pixels with a pixel value of 1 in the direction of y is large. If $m[y]$ is not greater than a, then $c[y]=0$ is recorded. Herein, $c[y]=0$ indicates that the number of pixels with a pixel value of 1 in the direction of y is small.

In an embodiment, a neighbor processing of the detection array may be performed; the target can be further compact by the neighbor processing to facilitate the determination of the first location and the second location, thereby improving the implementation speed of the browser reading mode.

The neighbor processing may include: judging whether three conditions (for example, $c[y]$ is equal to 0, $c[y-1]$ is equal to 1, and $c[y+1]$ is equal to 1), are all true at the same time, that is, whether $c[y]==0$ && $c[y-1]==1$ && $c[y+1]==1$ are true; performing the neighboring processing on the detection array $c[y]$ ($1 \leq y \leq Y$) when they are true, that is, recording $c[y]==1$, and then searching in the detection array $c[y]$ ($1 \leq y \leq Y$) for a maximum step size with continuous values of 1.

The neighboring processing is not performed on the detected array $c[y]$ ($1 \leq y \leq Y$) when they are not true, and the recording result remains unchanged, then searching in the detection array $c[y]$ ($1 \leq y \leq Y$) for a maximum step size with continuous values of 1.

Herein, a starting position of the maximum continuous step is a starting position of the longest continuous image in the longitudinal axis direction. The ending position of the maximum continuous step is the ending position of the longest continuous image in the longitudinal axis direction.

The step 102 of determining the first starting position and the first ending position of the body in the webpage snapshot in the longitudinal axis direction in a range from the starting position to the ending position in the longitudinal axis direction may include: an ordinate of the first starting position of the body of the webpage snapshot in the longitudinal axis direction being a ratio of an ordinate of the starting position of the longest continuous image in the longitudinal axis direction in the histogram statistical array to the resolution of the webpage snapshot; and an ordinate of the first ending position of the body of the webpage snapshot in the longitudinal axis direction being a ratio of an ordinate of the ending position of the longest continuous image in the longitudinal axis direction in the histogram statistical array to the resolution of the webpage snapshot.

Since the webpage snapshot resolution in the webpage rendering tree corresponding to the webpage is usually 1, an initially locating initial position and the first ending position of the body part to be extracted in the webpage snapshot with the resolution of 1 can be determined in this way.

The step 103 of determining the second starting position and the second ending position that satisfy a condition of not exceeding a span interval between a starting position and an ending position in the longitudinal axis direction may include searching, in positions of a rendering tree of the webpage snapshot, a starting position and an ending position with the largest difference in height in the longitudinal axis direction. Herein an ordinate of the searched starting position is greater than or equal to an ordinate of the first starting position, and an ordinate of the searched ending position is smaller than or equal to an ordinate of the first ending position.

Since the coordinate sets consisting of the starting position and the ending position in the position of the rendering tree in the webpage snapshot may be countless, only one set of the starting position and the ending position can simultaneously satisfy three conditions: an ordinate of the starting position are greater than or equal to an ordinate of the first starting position, an ordinate of the ending position are smaller than or equal to an ordinate of the first ending position, height difference in the longitudinal axis direction is largest.

After determining the second starting position and the second ending position of each webpage snapshot, the second starting position for each of the webpage snapshots may be connected to the second ending position of a previous webpage snapshot, so that the extracted content may be connected together to form a continuous reading mode.

Figure 2:
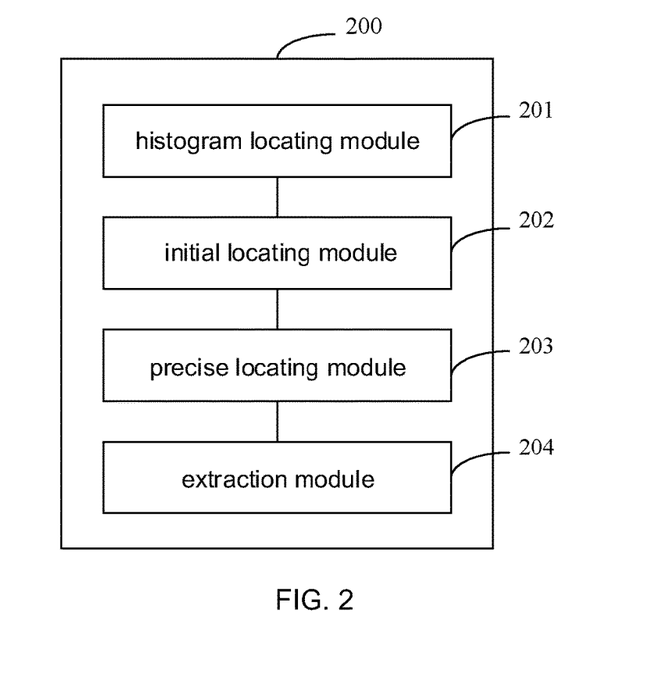
FIG. 2 is a schematic diagram of a device for processing webpage content according to an embodiment of the present disclosure.

FIG. 2 is a schematic diagram of a device for processing webpage content according to an embodiment of the present disclosure. As shown in FIG. 2, the device 200 for processing webpage content according to an embodiment of the present disclosure may include a histogram locating module 201, an initial locating module 202, a precise locating module 203 and an extraction module 204.

The histogram locating module 201 is configured to determine, in a histogram statistical array of the webpage snapshot, a starting position and an ending position of the longest continuous image in a longitudinal axis direction.

The initial locating module 202 is configured to determine, based on a resolution of the webpage snapshot, a first starting position and a first ending position of a body in the webpage snapshot in the longitudinal axis direction in a range from the starting position to the ending position in the longitudinal axis direction.

The precise locating module 203 is configured to determine, based a rendering tree of the webpage snapshot, a second starting position and a second ending position of the body in the webpage snapshot in the longitudinal axis direction in a range from the first starting position to the first ending position.

The extraction module 204 is configured to extract content between the second starting position and the second ending position.

In practical applications, the device further includes following modules.

A filtration processing module is configured to filter the webpage snapshot.

A binarization processing module is configured to binarize the filtered webpage snapshot.

An expansion processing module is configured to expand the binarized webpage snapshot.

A histogram statistical module is configured to perform histogram statistics of the expanded webpage snapshot in the longitudinal axis direction, to obtain a histogram statistical array in the longitudinal axis direction.

The filtration processing module is further configured to: switch the corresponding point of the link label of the webpage corresponding to the webpage snapshot from the displaying attribute mode to the hidden attribute mode.

The histogram statistical module is further configured to: perform statistics on the projection with an element value of 1 in the longitudinal axis direction of the expanded webpage snapshot, and obtain a histogram statistical array in the longitudinal axis direction according to a statistical result.

The histogram locating module 201 may include following units.

A detection array setting unit is configured to set a detection array.

A comparison unit is configured to compare a calculation of the histogram statistical array with a preset threshold.

A record unit is configured to: record the calculation of the detection array as 1 if the calculation of the histogram statistical array is greater than the preset threshold.

The record unit is further configured to: record the calculation of the detection array as 0 if the calculation of the histogram statistical array is less than or equal to the preset threshold.

A detection array search unit is configured to search, in the detection array, for a maximum continuous step size with a calculation of 1.

A detection array locating unit is configured to locate a starting position of the maximum continuous step size as the starting position of the longest continuous image in the longitudinal axis direction.

The detection array locating unit is further configured to: locate an ending position of the maximum continuous step size as the ending position of the longest continuous image in the longitudinal axis direction.

The initial locating module 202 includes following units.

An initial locating calculation unit is configured to calculate a ratio of an ordinate of the starting position of the longest continuous image in the longitudinal axis direction in the histogram statistical array to the resolution of the webpage snapshot.

The initial locating calculation unit is further configured to: calculate a ratio of an ordinate of the ending position of the longest continuous image in the longitudinal axis direction in the histogram statistical array to the resolution of the webpage snapshot.

An initial locating position determination unit is configured to locate the position, whose ordinate is the ratio of an ordinate of the starting position of the longest continuous image in the longitudinal axis direction in the histogram statistical array to the resolution of the webpage snapshot, as the first starting position.

The initial locating position determination unit is further configured to locate the position, whose ordinate is the ratio of an ordinate of the ending position of the longest continuous image in the longitudinal axis direction in the histogram statistical array to the resolution of the webpage snapshot, as the first ending position.

The precise locating module 203 includes following units.

A precise locating position determination unit is configured to search, in positions of the rendering tree of the webpage snapshot, a starting position and an ending position with the largest difference in height in the longitudinal axis direction.

A precise locating comparison unit is configured to compare whether an ordinate of the starting position searched by the precise locating position determination unit is greater than or equal to an ordinate of the first starting position.

The precise locating comparison unit is further configured to: compare whether an ordinate of the ending position searched by the precise locating position determination unit is less than or equal to an ordinate of the first ending position.

The device further includes following module.

A connecting module is configured to connect a second starting position for each of the webpage snapshots to a second ending position of a previous webpage snapshot.

Figure 3:
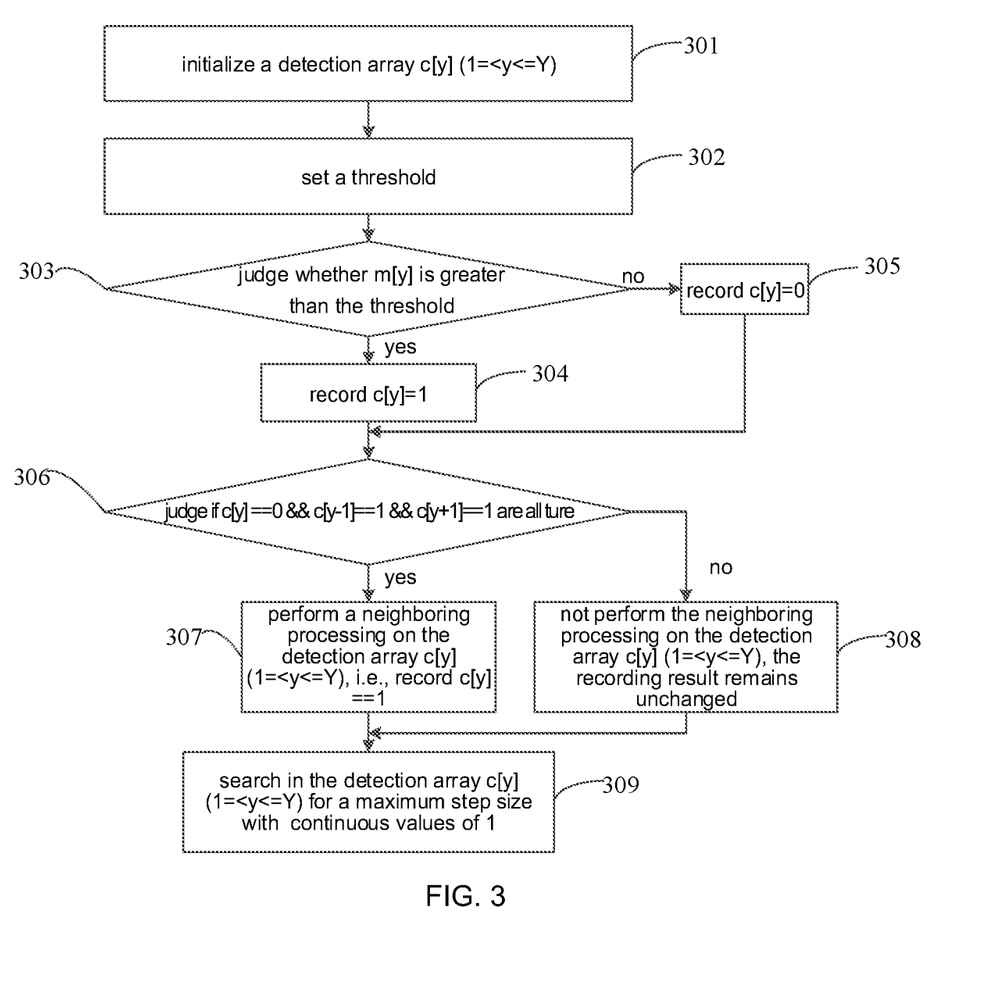
FIG. 3 is a schematic diagram of a process of determining, in a histogram statistical array, a starting position and an ending position of a longest continuous image in a longitudinal axis direction in the method of processing the webpage content according to an embodiment of the present disclosure.

FIG. 3 is a schematic diagram of a process of determining, in a histogram statistical array, a starting position and an ending position of a longest continuous image in a longitudinal axis direction in the method of processing the webpage content according to an embodiment of the present disclosure; as shown in FIG. 3, the process of determining, in a histogram statistical array, a starting position and an ending position of a longest continuous image in a longitudinal axis direction in the method of processing the webpage content according to an embodiment of the present disclosure includes the following steps.

In a step of 301: a detection array $c[y]$ ($1<=y<=Y$) is initialized. Herein, Y is the maximum pixel height of the webpage snapshot.

In a step of 302: a threshold "a" is set. Herein, "a" is a value smaller than the width of the webpage snapshot, In one embodiment, the threshold can be set to be one-half of the width of the webpage snapshot.

In a step of 303: it is judged whether $m[y]$ is greater than the threshold of "a"; if $m[y]$ is greater than the threshold of "a", step 304 is performed, otherwise step 305 is performed.

In a step of 304: $c[y]=1$ is recorded. Herein, $c[y]=1$ indicates that the number of pixels with a pixel value of 1 in the direction of y is large.

In a step of 305: $c[y]=0$ is recorded. Herein, $c[y]=0$ indicates that the number of pixels with a pixel value of 1 in the direction of y is small.

In a step of 306: it is judged if $c[y]$ is equal to 0, $c[y-1]$ is equal to 1, $c[y+1]$ is equal to 1 are all true at the same time, that is, whether $c[y]==0$ && $c[y-1]==1$ && $c[y+1]==1$ are true; if true, step 307 is performed, otherwise step 308 is performed.

In a step of 307: a neighboring processing on the detection array $c[y]$ ($1<=y<=Y$) is performed, that is, $c[y]==1$ is recorded, and then step 309 is performed.

In a step of 308: the neighboring processing on the detection array $c[y]$ ($1<=y<=Y$) is not performed, and the recording result remains unchanged; then step 309 is performed.

In a step of 309: a maximum step size with continuous values of 1 is searched in the detection array $c[y]$ ($1<=y<=Y$).

Herein, a starting position of the maximum continuous step is a starting position of the longest continuous image in a longitudinal axis direction. An ending position of the maximum continuous step is the ending position of the longest continuous image in the longitudinal axis direction.

Figure 4:
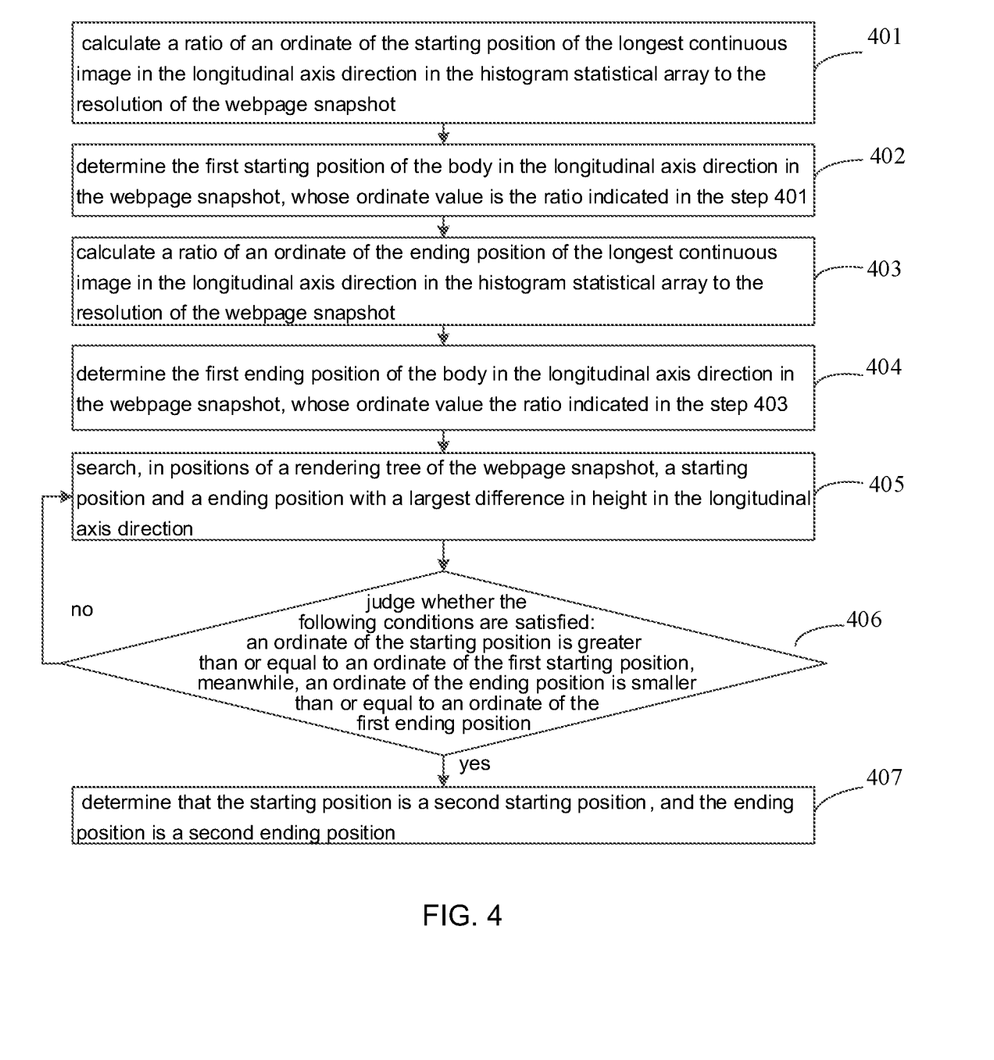
FIG. 4 is a schematic diagram of a process of determining a second starting position and a second ending position in an embodiment of the present disclosure.

FIG. 4 is a schematic diagram of a process of determining a second starting position and a second ending position in an embodiment of the present disclosure. As shown in FIG. 4, the process of determining a second starting position and a second ending position in an embodiment of the present disclosure includes the following steps.

In a step of 401: a ratio of an ordinate of the starting position of the longest continuous image in the longitudinal axis direction in the histogram statistical array to the resolution of the webpage snapshot is calculated.

In a step of 402: it is determined the first starting position of the body in the longitudinal axis direction in the webpage snapshot, whose ordinate value is the ratio indicated in the step 401.

in a step of 403: a ratio of an ordinate of the ending position of the longest continuous image in the longitudinal axis direction in the histogram statistical array to the resolution of the webpage snapshot is calculated.

In a step of 404: it is determined the first ending position of the body in the longitudinal axis direction in the webpage snapshot, whose ordinate value the ratio indicated in the step 403.

In a step of 405: it is searched, in positions of a rendering tree of the webpage snapshot, a starting position and an ending position with a largest difference in height in the longitudinal axis direction.

In a step of 406: it is judged whether the following conditions are satisfied: an ordinate of the starting position is greater than or equal to an ordinate of the first starting position, meanwhile, an ordinate of the ending position is smaller than or equal to an ordinate of the first ending position. If yes, perform step 407, otherwise perform step 405.

In a step of 407: it is determined that the starting position is a second starting position, and the ending position is a second ending position.

Figure 5:
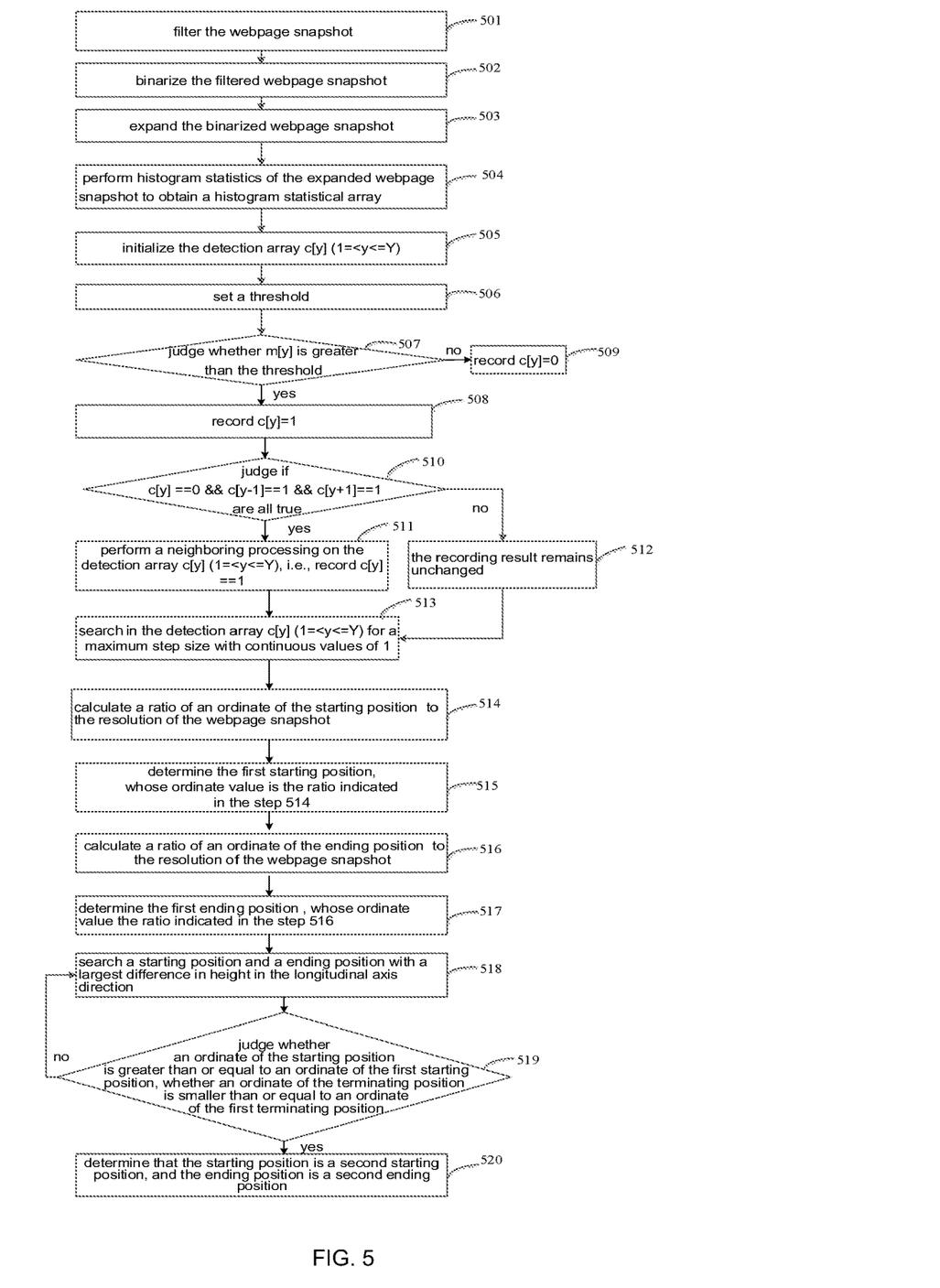
FIG. 5 is a schematic flowchart diagram of processing the webpage content according to an embodiment of the present disclosure.

FIG. 5 is a schematic flowchart diagram of processing the webpage content according to an embodiment of the present disclosure. As shown in FIG. 5, the flowchart of processing the webpage content according to an embodiment of the present disclosure. includes the following steps.

In a step of 501: the webpage snapshot is filtered.

In a step of 502: the filtered webpage snapshot is binarized.

In a step of 503: the binarized webpage snapshot is expanded.

In a step of 504: histogram statistics of the expanded webpage snapshot in the longitudinal axis direction is performed to obtain a histogram statistical array in the longitudinal axis direction.

In a step of 505: the detection array $c[y]$ ($1=<y<=Y$) is initialized. Herein, Y is the maximum pixel height of the webpage snapshot.

In a step of 506: a threshold a is set. Herein, a is a value smaller than the width of the webpage snapshot, preferably one-half of the width of the webpage snapshot.

In a step of 507: it is judged whether $m[y]$ is greater than a; if $m[y]$ is greater than a, step 508 is performed, otherwise step 509 is performed.

In a step of 508: $c[y]=1$ is recorded. Herein, $c[y]=1$ indicates that the number of pixels with a pixel value of 1 in the direction of y is large.

In a step of 509: $c[y]=0$ is recorded. Herein, $c[y]=0$ indicates that the number of pixels with a pixel value of 1 in the direction of y is small.

In a step of 510: it is judge if $c[y]$ is equal to 0, $c[y-1]$ is equal to 1, $c[y+1]$ is equal to 1 are all true at the same time, that is, whether $c[y]==0$ && $c[y-1]==1$ && $c[y+1]==1$ are true; if true, step 511 is performed, otherwise step 512 is performed.

In a step of 511: a neighboring processing on the detection array $c[y]$ ($1=<y<=Y$) is performed, that is, $c[y]==1$ is recorded, and then step 513 is performed.

In a step of 512: the neighboring processing on the detection array $c[y]$ ($1=<y<=Y$) is not performed, and the recording result remains unchanged; then step 513 is performed.

In a step of 513: it is searched in the detection array $c[y]$ ($1=<y<=Y$) for a maximum step size with continuous values of 1.

Herein, a starting position of the maximum continuous step is a starting position of the longest continuous image in a longitudinal axis direction. An ending position of the maximum continuous step is the ending position of the longest continuous image in the longitudinal axis direction.

In a step of 514: a ratio of an ordinate of the starting position of the longest continuous image in the longitudinal axis direction in the histogram statistical array to the resolution of the webpage snapshot is calculated.

In a step of 515: it is determined the first starting position of the body in the longitudinal axis direction in the webpage snapshot, whose ordinate value is the ratio indicated in the step 514.

In a step of 516: a ratio of an ordinate of the ending position of the longest continuous image in the longitudinal axis direction in the histogram statistical array to the resolution of the webpage snapshot is calculated.

In a step of 517: it is determined the first ending position of the body in the longitudinal axis direction in the webpage snapshot, whose ordinate value the ratio indicated in the step 516.

In a step of 518: it is searched, in positions of a rendering tree of the webpage snapshot, a starting position and an ending position with a largest difference in height in the longitudinal axis direction.

In a step of 519: it is judged whether the following conditions are satisfied: an ordinate of the starting position is greater than or equal to an ordinate of the first starting position, meanwhile, an ordinate of the ending position is smaller than or equal to an ordinate of the first ending position. If yes, step 520 is performed, otherwise step 518 is performed.

In a step of 520: it is determined that the starting position is a second starting position, and the ending position is a second ending position.

The embodiment of the present disclosure further provides storage medium having stored thereon computer programs, which, when executed by the processor, cause the processor to implement the provided by an embodiment of the present disclosure, such as the method for processing the webpage content shown in any one of FIG. 1, FIG. 3, FIG. 4 and FIG. 5.

It will be appreciated by a person skilled in the art that all or some of the steps, systems, and functional blocks/units in the device of the methods disclosed above may be implemented as software, firmware, hardware, and suitable combinations thereof. In a hardware embodiment, the division between functional modules/units mentioned in the above description does not necessarily correspond to the division of physical components; for example, one physical component may have multiple functions, or one function or step may be performed by several physical components working together. Some or all of the components may be implemented as software executed by a processor, such as a digital signal processor or microprocessor, or as hardware, or as an integrated circuit, such as an application specific integrated circuit. Such software may be distributed on a computer readable medium, which may include computer storage media (or non-transitory media) and communication media (or transitory media). As is well known to a person skilled in the art, the term computer storage medium includes volatile and nonvolatile, removable and non-removable media implemented in any method or technology for storing information, such as computer readable instructions, data structures, program modules or other data. Computer storage media include, but are not limited to, Random Access Memory (RAM), Read-Only Memory (ROM), and Electrically Erasable Programmable Read-only Memory (EEPROM), flash memory or other memory technology, compact disc read-only memory (CD-ROM), digital versatile disc (DVD) or other optical disc storage, magnetic cassette, magnetic tape, disk storage or other magnetic storage device, or any other medium used to store the desired information and be accessed by the computer. Moreover, it is well known to a person skilled in the art that communication media typically includes computer readable instructions, data structures, program modules, or other data in a modulated data signal, such as a carrier wave or other transmission mechanism, and can include any information delivery media.

The above is merely the preferred embodiment of the present disclosure, and is not intended to limit the protection scope of the present disclosure. Any modifications, equivalent substitutions and improvements made within the spirit and principles of the present disclosure should be included within the protection scope of the present disclosure.

The application can automatically locate the exact position of the content to be extracted in the body of the webpage, so as to avoid the inaccurate extraction content caused by extracting the body content of the webpage merely according to the label attribute, and improve the user experience; a direct extraction of the webpage content without limiting service environment is achieved, thereby enable a simple implementation and a wider application range.

What is claimed is:

1. A method for processing web content, comprising:
    determining, in a histogram statistical array of a webpage snapshot, a starting position and an ending position of a longest continuous image along a longitudinal axis direction;
    determining, based on a resolution of the webpage snapshot, a first starting position and a first ending position of a body in the webpage snapshot along the longitudinal axis direction in a range from the starting position to the ending position in the longitudinal axis direction;
    determining, based a rendering tree of the webpage snapshot, a second starting position and a second ending position of the body in the webpage snapshot in the longitudinal axis direction in a range from the first starting position to the first ending position;
    extracting content between the second starting position and the second ending position as a body content of the webpage snapshot; and
    processing the extracted content.

2. The method according to claim 1, the method further comprising:
    filtering the webpage snapshot;
    binarizing the filtered webpage snapshot;
    expanding the binarized webpage snapshot;
    performing histogram statistics of the expanded webpage snapshot in the longitudinal axis direction to obtain a histogram statistical array in the longitudinal axis direction.

3. The method according to claim 2, wherein the filtering the webpage snapshot comprises:
    switching a corresponding point of a link label of the webpage corresponding to the webpage snapshot from a displaying attribute mode to a hidden attribute mode.

4. The method according to claim 1, wherein the determining, in the histogram statistical array of the webpage snapshot, the starting position and the ending position of the longest continuous image in the longitudinal axis direction comprises:
    setting a detection array, a value range of elements in the detection array being the same as a value range of elements in the histogram statistical array;
    comparing a calculation of the histogram statistical array with a preset threshold; recording the calculation of the detection array as 1 when the calculation of the histogram statistical array is greater than the preset threshold; recording the calculation of the detection array as 0 when the calculation of the histogram statistical array is less than or equal to the preset threshold; and
    searching in the detection array for a maximum continuous step size with the calculation of 1;
    wherein a starting position of the maximum continuous step size is the starting position of the longest continuous image in the longitudinal axis direction, and an ending position of the maximum continuous step size is the ending position of the longest continuous image in the longitudinal axis direction.

5. The method according to claim 1, wherein the determining, based on the resolution of the webpage snapshot, the first starting position and the first ending position of the body in the webpage snapshot along the longitudinal axis direction in a range from the starting position to the ending position in the longitudinal axis direction comprises:
    determining an ordinate value of the first starting position of the body of the webpage snapshot in the longitudinal axis direction as a ratio of an ordinate of the starting position of the longest continuous image in the longitudinal axis direction in the histogram statistical array to the resolution of the webpage snapshot; and
    determining an ordinate value of the first ending position of the body of the webpage snapshot in the longitudinal axis direction as a ratio of an ordinate of the ending position of the longest continuous image in the longitudinal axis direction in the histogram statistical array to the resolution of the webpage snapshot.

6. The method according to claim 1, wherein the determining, based on the rendering tree of the webpage snapshot, the second starting position and the second ending position of the body in the webpage snapshot in the longitudinal axis direction in the range in the longitudinal axis direction from the first starting position and the first ending position comprises:
    searching, in positions of the rendering tree of the webpage snapshot, a starting position and an ending position with a largest difference in height in the longitudinal axis direction, and the searched starting position and the searched ending position satisfy the following conditions:
an ordinate of the searched starting position is greater than or equal to an ordinate of the first starting position, and an ordinate of the searched ending position is smaller than or equal to an ordinate of the first ending position.

7. The method according to claim 1, the method further comprising:
after determining the second starting position and the second ending position of the body in the webpage snapshot in the longitudinal axis direction,
connecting the second starting position of the webpage snapshot of the webpage to the second ending position of a previous webpage snapshot, to form continuous displaying information of a body part of the webpage.

8. A non-transitory storage medium storing computer programs, which, when executed by a processor, cause the processor to implement the method for processing web content according to claim 1.

9. A device for processing webpage content, comprising one or more processors and a storage storing one or more programs for execution by the one or more processors, the one or more programs including instructions for:
determining, in a histogram statistical array of a webpage snapshot, a starting position and an ending position of a longest continuous image along a longitudinal axis direction;
determining, based on a resolution of the webpage snapshot, a first starting position and a first ending position of a body in the webpage snapshot along the longitudinal axis direction in a range from the starting position to the ending position in the longitudinal axis direction;
determining, based a rendering tree of the webpage snapshot, a second starting position and a second ending position of the body in the webpage snapshot in the longitudinal axis direction in a range from the first starting position to the first ending position;
extracting content between the second starting position and the second ending position as a body content of the webpage snapshot; and
processing the extracted content.

10. The device according to claim 9, wherein the one or more programs further comprises instructions for:
filtering the webpage snapshot;
binarizing the filtered webpage snapshot;
expanding the binarized webpage snapshot;
performing statistics of projection with an element value of 1, of the expanded webpage snapshot in the longitudinal axis direction, and obtain a histogram statistical array in the longitudinal axis direction according to a statistical result.

11. The device according to claim 9, wherein the one or more programs further comprises instructions for:
switching a corresponding point of a link label of the webpage corresponding to the webpage snapshot from a displaying attribute mode to a hidden attribute mode.

12. The device according to claim 9, wherein the one or more programs further comprises instructions for:
setting a detection array;
comparing a calculation of the histogram statistical array with a preset threshold,
recording the calculation of the detection array as 1 when the calculation of the histogram statistical array is greater than the preset threshold; and recording the calculation of the detection array as 0 when the calculation of the histogram statistical array is less than or equal to the preset threshold;
searching, in the detection array, for a maximum continuous step size with the calculation of 1; and
locating a starting position of the maximum continuous step size as the starting position of the longest continuous image in the longitudinal axis direction; and locating a terminating position of the maximum continuous step size as the terminating position of the longest continuous image in the longitudinal axis direction.

13. The device according to claim 9, wherein the one or more programs further comprises instructions for:
calculating a ratio of an ordinate of the starting position of the longest continuous image in the longitudinal axis direction in the histogram statistical array to the resolution of the webpage snapshot; and calculating a ratio of an ordinate of the ending position of the longest continuous image in the longitudinal axis direction in the histogram statistical array to the resolution of the webpage snapshot; and
locating the position, whose ordinate is the ratio of an ordinate of the starting position of the longest continuous image in the longitudinal axis direction in the histogram statistical array to the resolution of the webpage snapshot, as the first starting position; and locating the position, whose ordinate is the ratio of an ordinate of the ending position of the longest continuous image in the longitudinal axis direction in the histogram statistical array to the resolution of the webpage snapshot, as the first ending position.

14. The device according to claim 9, wherein the one or more programs further comprises instructions for:
searching, in positions of the rendering tree of the webpage snapshot, a starting position and an ending position with a largest difference in height in the longitudinal axis direction;
comparing whether an ordinate of the starting position searched by the precise locating position determination unit is greater than or equal to an ordinate of the first starting position; and comparing whether an ordinate of the ending position searched by the precise locating position determination unit is less than or equal to an ordinate of the first ending position.

15. The device according to claim 9, wherein the one or more programs further comprises instructions for:
connecting the second starting position of the webpage snapshot of the webpage to the second ending position of a previous webpage snapshot, to form continuous displaying information of a body part of the webpage.

* * * * *